United States Patent

Weiser

Patent Number: 6,112,075
Date of Patent: Aug. 29, 2000

[54] METHOD OF COMMUNICATING EMERGENCY WARNINGS THROUGH AN EXISTING CELLULAR COMMUNICATION NETWORK, AND SYSTEM FOR COMMUNICATING SUCH WARNINGS

[76] Inventor: Douglas Diedrich Weiser, 623 Lakeview Rd., Lake St. Louis, Mo. 63367

[21] Appl. No.: 09/002,522

[22] Filed: Jan. 2, 1998

Related U.S. Application Data

[63] Continuation of application No. 08/335,150, Nov. 7, 1994, abandoned.

[51] Int. Cl.⁷ ........................................... H04Q 7/20
[52] U.S. Cl. ..................... 455/404; 455/521; 455/556; 455/557; 455/228; 340/539
[58] Field of Search ..................... 455/404, 466, 455/521, 38.1, 38.2, 31.2, 556, 557, 525, 227, 228, 344, 567; 340/825.44, 825.54, 539, 709, 601; 379/37, 39

[56] References Cited

U.S. PATENT DOCUMENTS

| | | | |
|---|---|---|---|
| 3,701,024 | 10/1972 | Knowles et al. | 455/526 |
| 4,415,771 | 11/1983 | Martinez | 379/43 |
| 4,435,843 | 3/1984 | Eilers et al. | 455/228 X |
| 5,272,465 | 12/1993 | Meares, Jr. | 340/539 |
| 5,278,539 | 1/1994 | Lauterbach et al. | 340/539 |
| 5,444,433 | 8/1995 | Gropper | 455/526 X |
| 5,448,618 | 9/1995 | Sandlerman | 455/404 X |
| 5,533,094 | 7/1996 | Sammugam | 425/426 |

*Primary Examiner*—Fan Tsang
*Assistant Examiner*—Philip J. Sobutka
*Attorney, Agent, or Firm*—Howell & Haferkamp, LC

[57] ABSTRACT

A method of communicating emergency warnings to persons within a selected in a region served by a cellular communication system that comprises a plurality of transmission stations, includes providing persons in the area with warning devices that generate an emergency warning in response to a predetermined signal; identifying at least one transmission station in the communication system to transmit the predetermined signal to warning devices in the selected area; and transmitting the predetermined signal from the identified transmission station to cause warning devices in the selected area to generate emergency warnings. The system for implementing this method includes a plurality of warning devices disbursed throughout the area, and a device for identifying one or more signal transmission stations in the cellular communication network appropriate to transmit the predetermined signal to warning devices in the selected area, and causing the transmission stations identified to transmit the predetermined signal to cause warning devices in the selected geographic area to generate emergency warnings.

13 Claims, 2 Drawing Sheets

METHOD OF COMMUNICATING EMERGENCY WARNINGS THROUGH AN EXISTING CELLULAR COMMUNICATION NETWORK, AND SYSTEM FOR COMMUNICATING SUCH WARNINGS

This application is a continuation of application Ser. No. 08/335,150, filed on Nov. 7, 1994, and now abandoned.

BACKGROUND AND SUMMARY OF THE INVENTION

This invention relates to a method of communicating emergency warnings utilizing an existing cellular communication network, and a system for communicating such emergency warnings.

There are a number of situations where it is desirable to issue warnings to a broad audience in a selected geographic area. For example, in the case of severe weather, such as a tornado, it is desirable to warn persons in the areas affected so that they can seek shelter. In some areas, audible alarm systems are provided to warn residents of such weather emergencies. However, not everyone in the area can hear these warnings. Moreover, it is expensive to establish and maintain this elaborate system just for occasional use. Another example of a situation where it is desirable to issue an emergency warning to a broad audience in a selected geographic area is in the case of a nuclear power plant or a toxic waste handing site. In these situations, special radio receivers have been provided to persons in areas likely to be affected, and special transmitters provided to transmit warnings to those special receivers. Again, it is expensive to establish and maintain this type of elaborate system just for occasional use. Moreover, these systems are local by nature, and do not provide warnings to persons just passing through the area.

The present invention provides a method and system for communicating emergency warnings through an existing cellular communication network. Cellular communication networks, and in particular cellular telephone networks, now cover large portions of the United States. These networks comprise a plurality signal transmission stations distributed across a geographic region. The primary function of these networks is to facilitate communication by cellular telephones, and the systems are maintained for that purpose. Thus, the cost of establishing and maintaining a major portion of the system is already financed. The method of the present invention utilizes this established cellular communication network to communicate emergency warnings to a selected geographic area within the geographic region served by the network. According to this method, persons within the area are provided with warning devices that generate an emergency warning in response to a predetermined signal transmitted from one of the signal transmission stations in the cellular communication network. When an emergency situation occurs, at least one signal transmission station in the cellular communication network, appropriate to transmit the predetermined signal to warning devices in the affected geographic area, is selected. Then the predetermined signal is transmitted from the selected transmission station to cause warning devices in the selected geographic area to generate emergency warnings.

The emergency warning is thus selectively transmitted to those warning devices within a certain proximity of the selected transmission stations. By utilizing a preexisting cellular communication network, the only additional cost of implementing the method and system is the provision of warning devices, which can be relatively simple and inexpensive. By making these devices universal (which is only possible by using selected transmission stations), the cost can be reduced and the method and system can function to provide emergency warnings to persons merely passing through the geographic area affected by the emergency.

The method and system of the present invention improve the ability of emergency management agencies to reach the population. The method and system operate independently of regular telephone and electrical service, which can be compromised in emergency situations. The method and system reaches persons inside buildings where sirens might be difficult to hear and where televisions and radios may not be in operation.

The system is simple in construction and operation. The warning units are triggered by a common predetermined signal, and geographical selectivity is achieved by proximity to particular cellular transmission stations. This eliminates the need for geographic encoding of the warning devices, or programming units for specific locations.

DETAILED DESCRIPTION OF THE PREFERRED EMBODIMENT

Figure 1:
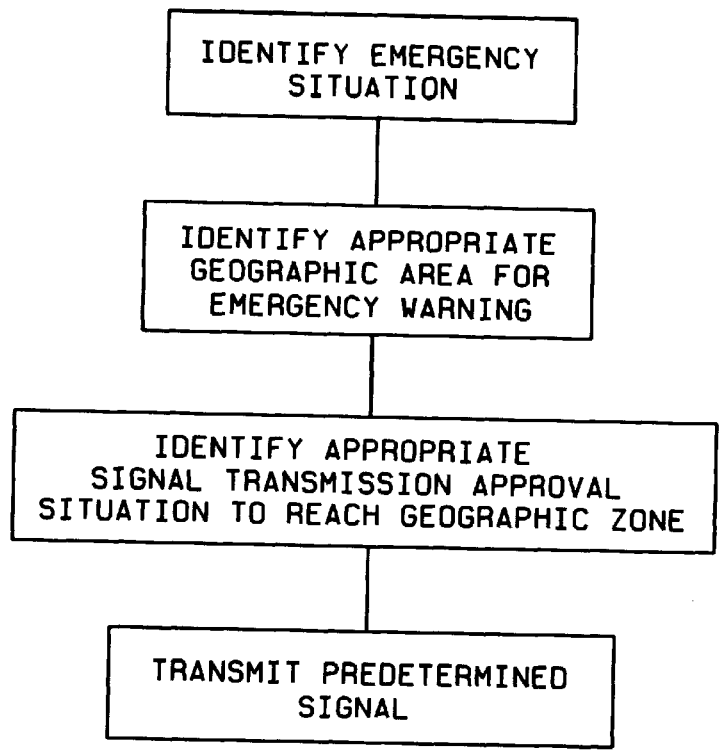
FIG. 1 is a flow chart of the method of the present invention.

According to the method of the present invention, persons within the geographic region to whom it would be desirable to communicate emergency warnings are provided with a warning device. In the case of weather warnings, the warning device might be provided to everyone in the region. In the case of nuclear power plants or toxic waste handling sites, the warning devices might only be provided to those persons in the region likely to be affected- by an emergency at such plants or sites.

The warning device is preferably a simple, inexpensive device that generates a emergency warning in response to receiving a predetermined signal. The emergency warning can be an audible alarm, a recorded or generated spoken warning, a visible warning, such as a flashing light, a tactile warning, such as a vibration or any combination thereof. The devices can all be made to be responsive to the same predetermined signal, and preferably are responsive to the same signal, the geographic selectivity of the emergency warning is controlled by controlling the transmission of the preselected signal. If all of the devices are responsive to the same signal, then a device can be used to receive signals in any area where the signal may be given. Thus, for example if an automobile, truck, or train is carrying such a warning device, and traverses a geographic area where a warning is being communicated, then the persons in the automobile, truck, or on the train will likewise receive the emergency warning via the warning device.

Of course it is possible to make the warning device responsive to more than one preselected signal, and to have the warning device generate different specific emergency warnings in response to differing preselected signals. Thus it is possible to use this method and system to warn of varying degrees of emergency, or to warn of several different types of emergencies. For example, the method and system could be used to send an emergency warning of a severe weather alert, a severe weather watch, and a severe weather warning.

In the preferred embodiment the warning device has a 110 VAC standard grounded male three-prong plug flush mounted to the back of the device for wall mounting. The device would include a receiving antenna tuned to cellular frequencies. The antenna is preferably flexible and/or retractable. The device preferably includes a DC power supply to maintain a rechargeable back-up battery circuit.

In the preferred embodiment the warning device has an audible signal, similar to that in many home smoke alarms. However, the warning device should have a distinctive signal so that the warning signal is not confused with some other type of alarm. The warning device has suitable circuitry, whose design is well within the ability of a person of ordinary skill in the art, that recognizes a preselected "MINS" cellular signal, transmitted from one or more selected transmission stations in the cellular communication network. The device also has suitable circuitry, also within the ability of a person of ordinary skill in the art, responsive to recognition of the "MINS" cellular signals to generate the emergency warning.

When an emergency occurs, or is about to occur, affecting a particular geographic area, one or more transmission stations within the cellular communication net work are identified as appropriate to transmit the predetermined signal to warning devices in the selected geographic area. As a general rule, the identified transmission stations will be those closest to the selected geographic area. The preselected signal is then transmitted from the identified signal transmission station(s) to cause warning devices in the selected geographic area to generate emergency warnings.

Emergency management agencies or other authorities responsible for issuing emergency warnings can activate specific transmission stations, for example by ground line telephone and computer links. The system of this invention is readily adaptable to automation, for example, when a weather monitoring system identifies an emergency in a particular geographic area, a computer can automatically identify the cellular transmission stations appropriate for that particular geographic area, and automatically cause the appropriate transmission stations to transmit the preselected signal.

One embodiment of the method of the present invention is represented schematically in FIG. 1. In the first step, an emergency situation is identified. In the second step, the appropriate geographic area for the emergency warning is identified. In the third step, the appropriate signal transmission stations to reach the geographic area are identified. This can be done with a manual or automated look-up table, or geographically on a map, or otherwise. In the fourth step, the predetermined signal is transmitted from the identified transmission stations, thereby activating the warning devices in the vicinity of the identified transmission stations, and providing a warning to persons in proximity to the warning, device.

Figure 2:
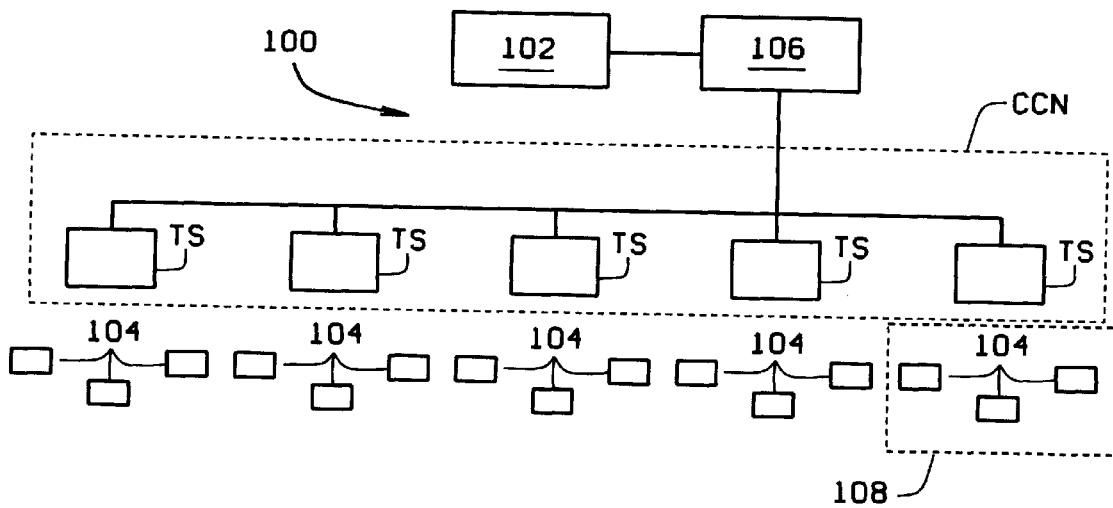
FIG. 2 is a schematic diagram of the embodiment of a system for implementing the method of this invention.

One possible implementation of the system of this invention is illustrated schematically in FIG. 2. The system 100 comprises a device 102 for automatically identifying a geographic area where an emergency situation exists. The system also comprises a plurality of warning devices 104 disbursed in the region. The warning devices 104 generate an emergency warning in response to a predetermined signal from a signal transmission station (TS) in a cellular communication network (CCN). The system also includes a device 106 that automatically identifies one or more of the signal transmission stations (TS) appropriate to transmit the predetermined signal and causes the identified signal transmission station to transmit the predetermined signal. The warning devices 104 within the transmission range of the signal transmission station are activated by the predetermined signal and provide an emergency warning to those persons in the vicinity of the warning devices. For example, if device 102 identified an emergency situation in area 108, the device 106 would identify the signal transmission station (TS) 110 as appropriate to reach area 108, and cause the signal transmission station 110 to send the predetermined signal. This actuates the warning devices 104 in the area 108, but not the other warning devices, which are too remote from station 110 to react to the predetermined signals.

OPERATION

Figure 3:
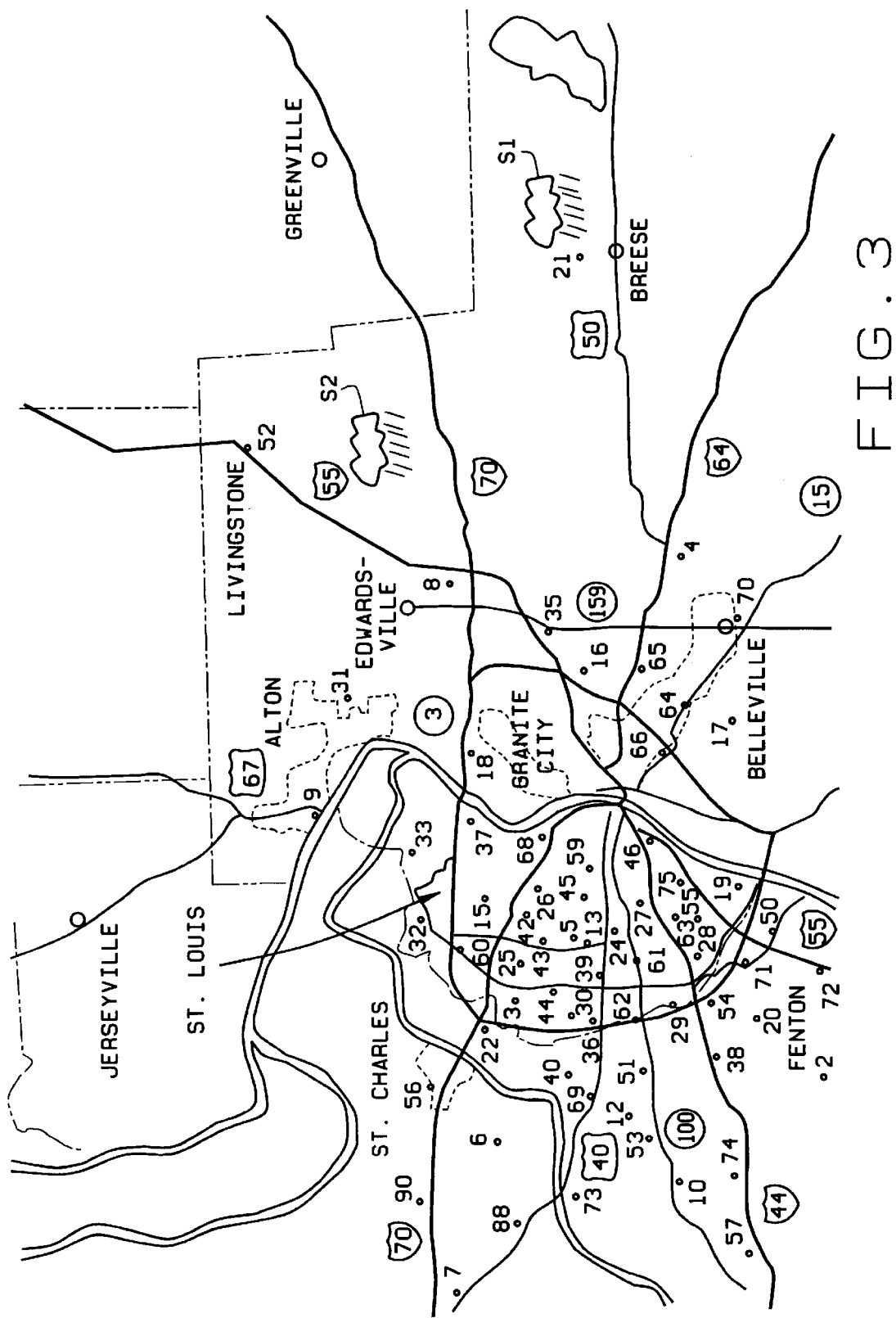
FIG. 3 is a map of a geographic region served by cellular communication network of the type utilized by the present invention, illustrating the operation of the method of this invention.

The operation of the method and system of the presents invention are best understood with reference to the FIG. 3 map. FIG. 3 is a map of a geographic region served by a cellular communication network comprising a plurality of signal transmission stations identified with one or two-digit numbers. According to the method of this invention, if a storm was identified at S1, the signal transmission station 21 would be identified as appropriate to generate the predetermined signal to warning devices in areas affected by the storm. The predetermined signal would then be transmitted from signal transmission station 21, causing warning devices in the vicinity of the station and in the vicinity of the storm at S1, to generate emergency warnings. Similarly, if a storm were identified at S2, the signal transmission stations 8 and 52 might be identified as appropriate to generate the predetermined signal to warning devices in areas affected by the storm. The predetermined signal would then be transmitted from signal transmission stations 8 and 52, causing warning devices in the vicinity of those stations and the vicinity of the storm at 52 to generate an emergency warning.

The method and system of the invention can also be coupled with radio broadcast technology. For example, a warning device can be incorporated into a car, and coupled to the car radio such that when the warning device is triggered by the predetermined signal, the warning device tunes the radio, or if the radio is not on it turns on and tunes the radio to an appropriate station. It is presently known to incorporate station identifying signals in radio broadcasts, an it is further known to provide radios capable of identifying these station identifying signals and automatically tune to stations with particular identifying signals.

Thus, the warning device could cause the car radio to tune to a radio station with particular identifiers which station broadcasts appropriate warning messages. While this can be adopted for home or institutional use, it is particularly appropriate for use in vehicles, because the persons in vehicles are likely to be strangers to the area, and may not otherwise know what to do if just a simple alarm is given.

What is claimed is:

1. A method of communicating emergency warnings to persons within a selected geographic area within a geographic region served by an existing cellular communication system that comprises a plurality of signal transmission stations, the method comprising:

providing a plurality of warning devices within the geographic region;

identifying one or more, but less than all, of the plurality of transmission stations in the cellular communication system appropriate to activate warning devices in the geographic area; and transmitting a predetermined signal from the identified transmission station or stations to activate all the active warning devices in the geographic area of the geographic region, which warning devices generate emergency warnings in response to the predetermined signal.

2. The method of communicating emergency warnings according to claim 1, wherein the method comprises transmitting one of several predetermined signals, and wherein the warning devices generate different warnings depending upon what predetermined signal is transmitted.

3. The method of communicating emergency warnings according to claim 1 wherein the warning devices are coupled with a radio receiver, and automatically tune the radio receiver to a radio station in response to the predetermined signal.

4. A method of communicating emergency warnings to persons within a selected geographic area within a geographic region served by an existing cellular communication system that comprises a plurality of signal transmission stations, the method comprising:

providing a plurality of warning devices in the geographic region, which warning devices generate an emergency warning in response to a predetermined signal transmitted from one of the signal transmission stations;

identifying at least one signal transmission station in the cellular communication system, but less than all of the transmission stations of the plurality of signal transmission stations in the cellular communication system, appropriate to transmit the predetermined signal to the warning devices in the selected geographic area;

transmitting the predetermined signal only from the identified signal transmission station or stations to cause all the active warning devices in the selected geographic area to generate emergency warnings.

5. The method of communicating emergency warnings according to claim 4 wherein the warning devices generate different warning signals in response to different predetermined signal transmitted from one of the signal transmission stations; and wherein the step of transmitting the predetermined signal comprises selecting from several predetermined signals, a predetermined signal that will cause the warning devices to generate an appropriate warning signal.

6. The method of communicating emergency warnings according to claim 4 wherein the warning devices are coupled with a radio receiver, and automatically tune the radio receiver to a radio station in response to the predetermined signal.

7. A method of communicating emergency warnings to persons within a selected geographic area within a geographic region served by an existing cellular communication system that comprises a plurality of signal transmission stations, the method comprising:

providing a plurality of warning devices in the geographic region, which warning devices generate an emergency warning in response to a predetermined signal transmitted from one of the signal transmission stations;

identifying a selected geographic area where an emergency warning should be communicated to the persons in the area;

identifying at least one signal transmission station in the cellular communication system, but less than all of the transmission stations of the plurality of signal transmission stations in the communication system, appropriate to transmit the predetermined signal to the warning devices in the selected geographic area;

transmitting the predetermined signal only from the identified signal transmission station to cause all the active warning devices in the selected geographic area to generate emergency warnings.

8. The method of communicating emergency warnings according to claim 7 wherein the warning devices generate different warning signals in response to different predetermined signal transmitted from one of the signal transmission stations; and wherein the step of transmitting the predetermined signal comprises selecting from several predetermined signals, a predetermined signal that will cause the warning devices to generate an appropriate warning signal.

9. The method of communicating emergency warnings according to claim 7 wherein the warning devices are coupled with a radio receiver, and automatically tune the radio receiver to a radio station in response to the predetermined signal.

10. A system for communicating emergency warnings to persons within a selected geographic area within a geographic region served by an existing cellular communication system that comprises a plurality of signal transmission stations, the system comprising:

a plurality of warning devices in the possession of persons within the geographic region, the warning devices generating an emergency warning in response to a predetermined signal transmitted from a signal transmission station in a cellular communication network;

a device for identifying one or more signal transmission stations in the cellular communication system, but less than all of the plurality of signal transmissions stations in the cellular communication system, appropriate to transmit the predetermined signal to the warning devices located within the selected geographic area, and causing the transmission stations identified to transmit the predetermined signal to cause all the active warning devices in the selected geographic area to generate emergency warnings.

11. The system according to claim 10 wherein the warning devices are coupled with a radio receiver, and automatically tune the radio receiver to a radio station in response to the predetermined signal.

12. A system for automatically identifying emergency situations and communicating emergency warnings to persons within a selected geographic area within a geographic region served by an existing cellular communication system that comprises a plurality of signal transmission stations, the system comprising:

a device for automatically identifying a geographic area where an emergency situation exists;

a plurality of warning devices in the possession of persons within the geographic region, the warning devices generating an emergency warning in response to a predetermined signal transmitted from a signal transmission station in a cellular communication system;

a device for automatically identifying one or more signal transmission stations in the cellular communication system, but less than all of the plurality of signal transmission stations system in the cellular communication system, appropriate to transmit the predetermined signal to all the warning devices in the selected geographic area, and causing only the transmission stations identified to transmit the predetermined signal from the identified signal transmission station to cause the active warning devices in the selected geographic area to generate emergency warnings.

13. The system according to claim 12 wherein the warning devices are coupled with a radio receiver, and automatically tune the radio receiver to a radio station in response to the predetermined signal.

* * * * *